Oct. 21, 1947.    H. W. LORD    2,429,471
PULSE GENERATING CIRCUIT
Filed Feb. 21, 1944
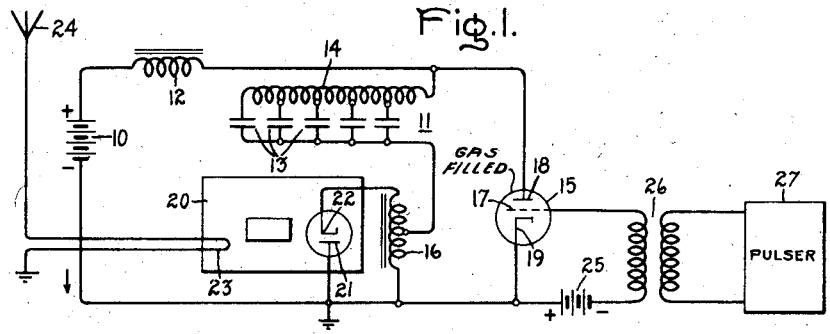
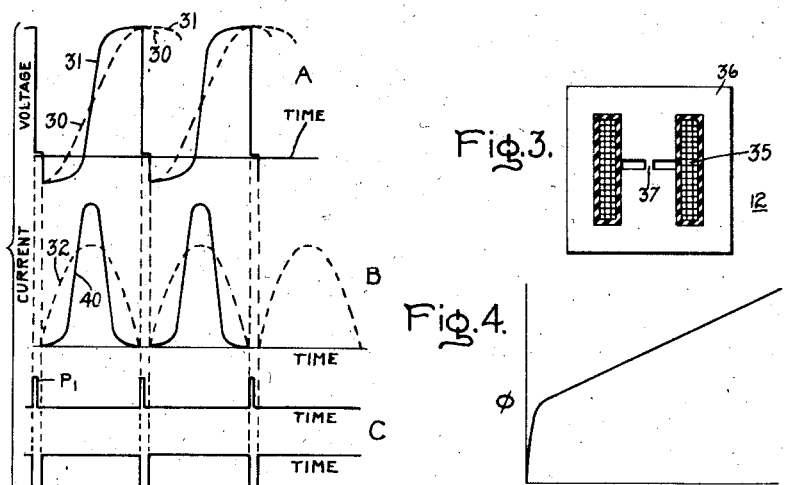
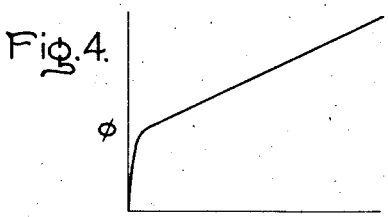
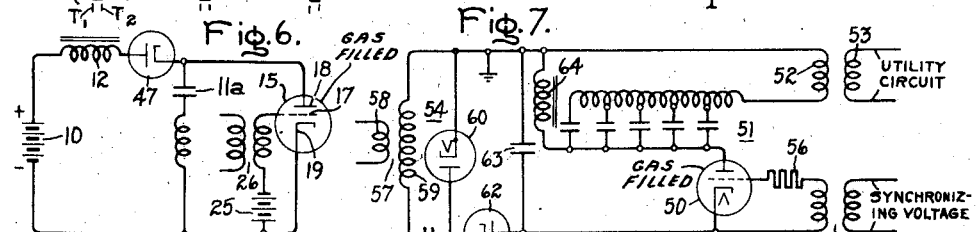
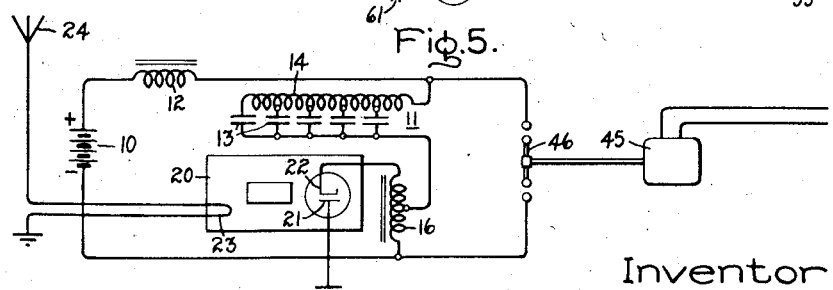
Inventor:
Harold W. Lord,
by Harry E. Dunham
His Attorney.

Patented Oct. 21, 1947

2,429,471

UNITED STATES PATENT OFFICE 2,429,471

PULSE GENERATING CIRCUIT

Harold W. Lord, Schenectady, N. Y., assignor to General Electric Company, a corporation of New York Application February 21, 1944, Serial No. 523,281

19 Claims. (Cl. 250—27)

My invention relates to pulse generating circuits, and particularly to such circuits of the capacitor type. The invention is especially applicable to pulse generating circuits for use in connection with pulsed high frequency transmitters and the like.

An object of my invention is to provide new and improved circuits of this character which are efficient, simple in form, and capable of producing pulses of considerable power.

It is a further object of my invention to provide a capacitive pulse generator of oscillatory charging type in which the triggering instant is rendered less critical than heretofore thereby to improve the operation of pulse generators wherein the repetition rate of the triggering means is not accurately controllable.

It is a still further object of my invention to provide means for improving the operation of capacitive pulse generators controlled by electron discharge devices of the ionizable medium type.

It is a more specific object of my invention to provide a gas-filled tube controlled pulse generating circuit having a greater available deionization time than has been heretofore obtainable for a predetermined repetition rate, or alternatively having a greater permissible repetition rate than heretofore obtainable while providing a predetermined deionization time.

Briefly, the invention comprises a source of unidirectional charging potential, a capacitive storage element, and a capacitor discharging circuit in combination with switching means for initiating either charging or discharging of the capacitive element at a desired repetition rate. For the purpose of controlling the rate of change of charge of the capacitive element between pulses, and particularly to reduce the initial rate of change thereby to increase the available deionization time for the switching means where such switching means is an electron discharge device containing an ionizable medium, a reactance in the capacitor charging or discharging circuit through which current flows between pulses is provided with a non-linear impedance-current characteristic so that its impedance decreases as the current therethrough increases.

For a more complete understanding of my invention and a further appreciation of its objects and advantages, reference should now be had to the following detailed specification taken in conjunction with the accompanying drawings, in which Fig. 1 is a schematic circuit diagram illustrating a pulse generating circuit embodying my invention in one form; Fig. 2 is a graphical representation of certain of the electrical characteristics of the pulse generating circuit shown at Fig. 1; Fig. 3 is a cross-sectional view of an exemplary non-linear reactor suitable for use in connection with the circuit of Fig. 1; Fig. 4 is a graphical representation of the current-voltage characteristic of the reactor of Fig. 3; and Figs. 5, 6, and 7 are schematic circuit diagrams illustrating my invention as applied to pulse generating circuits of various other types.

Referring now to Fig. 1, I have illustrated therein a pulse generating circuit comprising a source of substantially constant unidirectional potential such as a battery, 10, connected to charge a capacitive storage element 11 through a non-linear inductive reactor 12. The reactor 12 exhibits a negative reactance-current characteristic. The capacitive storage element 11 is preferably, though not necessarily, an open ended artificial transmission line section comprising a plurality of capacitors 13 and a plurality of reactors 14. The capacitors 13 are directly connected together at one side and the other sides of the capacitors are connected together through reactors 14. It is well understood by those skilled in the art that when such a transmission line section is arranged to discharge through a predetermined resistance of characteristic value, known as its surge impedance, the line dissipates substantially all the energy stored therein in a single current pulse of substantially rectangular wave form.

The artificial transmission line section 11 is connected for discharge through a circuit comprising an electron discharge device 15 and a portion of an impedance matching load transformer 16. The electron discharge device 15 is preferably of the grid-controlled gas-filled type, such as a Thyratron. It is a well-known characteristic of such a device that the potential of the control electrode 17 controls the initiation of discharge between the anode 18 and cathode 19, but that after discharge is once initiated and ionization of the contained gas effected the control electrode 17 is substantially ineffectual to further control the discharge.

The transformer 16 constitutes a load device through which the rectangular current pulse from the capacitive storage element 11 is discharged. By way of example, I have shown conventionally a magnetron oscillator 20 having an anode 21 and a cathode 22 connected in the output circuit of the impedance matching transformer 16. One terminal of the artificial transmission line section 11 is connected to an intermediate point on the impedance matching transformer 16 in such a manner that the anode to cathode resistance of the magnetron oscillator 20 will appear in the primary circuit of the transformer 16 as an impedance slightly smaller than the surge impedance of the transmission line section 11. Preferably, the transmission line section 11 and the magnetron impedance are slightly mismatched in this manner for a reason which will be more fully explained hereinafter. The magnetron oscillator 20 is shown coupled by means of an inductive loop 23 to an antenna 24 from which pulses of high frequency wave energy are radiated.

For the purpose of initiating discharge of the transmission line section 11 through the Thyratron 15 and load transformer 16 at a desired repetition rate, I have shown the control electrode 17 of the discharge device 15 normally biased negative, as for example by a battery 25, and coupled through a transformer 26 to a source 27 of suitable triggering impulses. The source 27 and transformer 26 are so arranged that the triggering impulses of the source 27 momentarily drive the control electrode 17 of the discharge device 15 positive at a desired repetition rate thereby periodically to initiate discharges of the capacitive element 11 through the discharge device 15 and load transformer 16.

To consider in greater detail the operation of the device let it first be assumed that the artificial transmission line section 11 is charged to its maximum voltage V and that the discharge device 15 is non-conducting. It is well known to those skilled in the art that, if the predetermined surge impedance is now suddenly connected across the charged transmission line 11, the voltage across the terminals of the transmission line will fall substantially instantaneously to one-half its former value, or $$\frac{V}{2}$$

and a voltage having the magnitude $$\frac{V}{2}$$

will suddenly appear across the load impedance. However, as mentioned hereinbefore, the impedance presented by the load transformer 16 preferably is slightly less than the surge impedance of the line so that when the transmission line 11 is connected to the load slightly more than half of the voltage appears across the transmission line terminals and slightly less than half of the voltage appears across the load. The sudden change in voltage at the terminals of the transmission line starts a voltage wave down the line from the terminal end toward the remote open-circuited end.

Referring now to Fig. 2, let is be assumed that at a time $T_1$ a triggering pulse $P_1$ of positive potential is supplied to the control electrode 17 of the gas-filled electron discharge device 15 from the source 27. The upper diagram A of Fig. 2 represents the voltage betwen the anode and cathode of the gas-filled electron discharge device 15 plotted with respect to time. The solid line curve 31 of diagram A represents such voltage if the reactor 12 is non-linear, and the broken line curve 30 is drawn for a linear reactor by way of comparison. Immediately before the triggering instant the voltage across the tube 15 is a maximum. As soon as the tube 15 becomes conducting the potential of the anode 18 drops substantially instantaneously to zero or ground potential and voltage is applied across the primary section of the impedance matching load transformer 16. Also, at this time a voltage wave is started down the transmission line 11 from the terminal end. This wave will be reflected back from the remote open end of the line, and during the time taken for the wave to travel from the terminal end of the transmission line to the remote end and back again, which time may be of the order of one microsecond, the potential of the anode 18 remains at zero and a pulse of current flows through the discharge circuit and the load transformer 16. This pulse of current is indicated at $I_1$ on diagram C of Fig. 2. At a time $T_2$ when the reflected wave appears at the terminals of the transmission line section 11, the voltage at the transmission line terminals is suddenly reduced to zero and builds up to some extent in the opposite direction as indicated by the lower portion of curve 31. Since the discharge device 15 conducts in only one direction, current flow through the load abruptly ceases and the potential of the anode 18 of the discharge device 15 is driven slightly negative with respect to the grounded cathode 19, as indicated at the curve A of Fig. 2. The purpose of mismatching the impedance of the load transformer 16 and the transmission line 11 is now evident. It is such mismatching which results in driving the anode 18 slightly negative at the termination of a pulse, for if the load impedance were perfectly matched with the line the reflected wave would reduce the line terminal voltage only to zero. The negative potential upon the anode 18 ensures abrupt termination of the current pulse and allows the control electrode 17 to regain control of the tube.

Upon cessation of the pulse discharge through the device 15, recharging of the capacitive storage element 11 from the constant potential source 10 begins. For the purpose of illustration, let it first be assumed that the charging reactor 12 is linear and that, as in an ideal case, the charging circuit is without resistance. In such a case the entire voltage of the source 10 appears initially across the reactor 12 and none of the voltage appears across the capacitive element 11. As the charging current increases, the voltage across the capacitive element 11, and therefore the voltage of the electrode 18 with respect to ground, gradually increases along the curve 30 of Fig. 2. The charging current itself is illustrated by the broken line curve 32 at diagram B of Fig. 2. When the charging current reaches a maximum value, the voltage across the capacitive element 11 is equal to the voltage of the source 10 and substantially no voltage appears across the reactor 12. However, the energy stored in the reactor 12 by reason of the large current flow therethrough is at this time equal to the energy stored in the capacitive element 11, so that as the charging current decreases the energy of the reactor 12 is transferred to the capacitive element 11, thereby to increase the voltage of the capacitive element to substantially double the voltage of the source 10. This action results in a charging current and capacitor voltage each of substantially sine-wave shape, as illustrated by the curves 30 and 32 of Fig. 2. The maximum voltage of the anode 18 is thus equal to substantially twice the voltage of the charging source 10. If now no changes in the circuit connections were made, the capacitive storage element 10 would discharge in a reverse direction through the source 10 and oscillations would be set up at a natural frequency determined by the circuit constants of the charging circuit. Such frequency may, by way of illustration only, be of the order of 500 cycles per second. Continuous oscillation is prevented however by discharging the capacitive element 11 through the discharge device 15 at the instant when its voltage reaches the maximum value, or one half cycle after the beginning of the charging period. The manner in which this discharge takes place has been described heretofore. From the foregoing it will be understood that my invention is not limited to a unidirectional current charging source, but that, if desired, a source of alternating current may be used for charging.

Let it now be assumed that the reactance-current characteristic of inductive reactor 12 is negative. Such non-linearity may be attained in the manner illustrated at Fig. 3 wherein there is shown a winding 35 mounted upon an iron core 36 having a restricted or saturable flux-carrying section 37. The voltage-current characteristic of such a device, when used as an inductive impedance, is shown at Fig. 4. The curve of Fig. 4 demonstrates the fact that after the saturable section 37 of the reactor core becomes saturated, the inductance, or rate of change of flux with respect to current, decreases sharply. This means that the inductive reactance of the reactor 12 is initially large and becomes smaller as the current therethrough increases.

The effect of such non-linearity of the reactance device 12 will become apparent by referring to diagram B of Fig. 2 where the solid line curve 40 represents the charging current through the reactor 12 when such reactor is non-linear, in the manner illustrated at Figs. 3 and 4. It will be observed that initially the charging current is smaller than it would be with a linear reactor because of the initially larger inductive reactance. However, as the current increases, the inductive reactance becomes smaller, so that the rate of change of current is appreciably greater than shown by the curve 22 and the maximum current is appreciably higher. The charging current of curve 40 results in the voltage characteristic of curve 31 of Fig. 2. It will be observed that, begining at the time T₂ when the charging period begins, the voltage of the anode 18 increases very slowly at first and remains negative for a period appreciably longer than indicated by the broken line curve 30 drawn for a linear reactor. This initial low rate of increase of anode voltage results from the low initial charging current indicated by the curve 40. Furthermore, the anode voltage curve 31 reaches its maximum earlier than indicated by the curve 30 as a result of the rapid increase in charging current following the low initial charging rate.

It may now be observed that, as a result of utilizing a non-linear reactor 12 in the charging circuit of the artificial transmission line 11 along with a discharge resistance slightly mismatched with respect to the transmission line 11, the available deionization time for the electric discharge device 15 is increased appreciably. The available deionization time is that period for which the voltage of the anode 18 remains negative with respect to the voltage of the cathode 19. Obviously, if the anode voltage goes positive before deionization is completed, discharge will take place immediately and before the control electrode 17 regains control. Ordinarily, the maximum repetition rate is limited by the available deionization time and the charging circuit is tuned to a natural frequency providing the necessary deionization time. It is evident that by using my invention the natural frequency of the charging circuit, and hence the discharge repetition rate, may be increased while maintaining a predetermined desired deionization time.

At diagram A of Fig. 2, I have also shown an extension of the curves 30 and 31 beyond the instant of discharge to indicate that the curve 31 is appreciably more flat-topped than is the curve 30. This characteristic of my non-linear reactor circuit is useful in providing a greater tolerance in timing the repetitive discharges. With a charging characteristic of the type shown at the curve 30, the optimum instant of discharge is quite critical if it is desired always to discharge at the maximum condenser voltage. With a charging characteristic of the type of the curve 31, however, it is possible to utilize a discharge switch of less accurate periodicity than the triggered tube 15 of Fig. 1 without affecting the magnitude of the pulses. For example, at Fig. 5 I have shown a pulse generating circuit similar to that of Fig. 1 except that the capacitive storage element 11 is periodically discharged through a rotatable spark gap device comprising a synchronous motor 45 and a rotatable sparking electrode 46. The timing accuracy of such a mechanical device is inherently less than that of the triggered discharge tube 15 of Fig. 1, and the use of a non-linear charging reactor in the circuit of Fig. 5 appreciably improves the operation of a spark gap pulser in the manner described hereinbefore. In all other respects the circuit of Fig. 5 is similar to that of Fig. 1, and like parts have been assigned the same reference numerals.

I wish to have it understood that my invention is not limited in its application to pulse generating circuits in which the repetition rate is determined by the natural frequency of the tuned condenser charging circuit. In the circuits thus far described the maximum repetition rate of twice the natural frequency of the charging circuit has been used. To illustrate another application of my invention, I have shown at Fig. 6 a pulse generating circuit similar to that of Fig. 1, but in which a blocking rectifier 47 is connected in series circuit relation in the condenser charging circuit to maintain the maximum charge upon the capacitive element for any desired period. With such blocking any repetition rate lower than the maximum repetition rate is permissible while nevertheless providing a high maximum repetition rate with relatively long available deionization time if desired.

Fig. 6 also illustrates the fact that my invention is not limited in its utility to use in connection with a capacitive storage element of the artificial transmission line type. For example, at Fig. 6 I have shown a capacitive storage element in the form of a simple condenser 11a. For simplicity of illustration, the magnetron oscillator 20 and transmitting antenna 24 have been omitted from Fig. 6, but it will be understood that the inclusion of such elements or their equivalents in the circuit is contemplated. In all other respects Fig. 6 is similar to Fig. 1 and like parts have been assigned the same reference numerals.

My invention is also applicable to pulse generating circuits in which pulses are generated by periodic charging of a capacitive storage element, as contrasted with periodic discharging of such an element as previously described. By way of example, I have illustrated at Fig. 7 a pulse generating circuit similar to that shown at Fig. 1 of my copending application, Serial No. 475,597, filed February 12, 1943, now Patent 2,394,389, granted February 5, 1946, and assigned to the same assignee as the instant application, wherein the broader aspects of such a circuit are particularly described and claimed. Referring to this figure of the drawings, an electron discharge device 50 which preferably are of the gas-filled type such as a Thyratron, is connected in series circuit relation in the charging circuit of a pulse-forming capacitive artificial transmission line section 51. The series charging circuit also includes a load device illustrated as a transformer having a primary winding 52 and a secondary winding 53. The winding 52 is connected at one side to the grounded positive terminal of a suitable direct current source 54 and at the other side through a reactor section to the artificial transmission line 51. The secondary winding 53 of the load transformer is connected to a suitable utilization circuit, such as a high frequency transmitter oscillator (not shown). In order to synchronize the pulses or to initiate a pulse whenever desired, a source of synchronizing voltage is connected between the cathode and the control electrode of the discharge device 50. In the illustrative form of my invention, such source comprises a transformer 55, the secondary winding of which is connected between the cathode and control electrode of the device 50 through a resistor 56. The primary winding of the transformer 55 is connected to any suitable triggering circuit or device for supplying the necessary potentials to cause the discharge device 10 periodically to become conductive.

The illustrative direct current source 54 is of the doubler type, and comprises a transformer 57 having a primary winding 58 connected to any suitable source of alternating current and a secondary winding 59 connected in series circuit relation with a diode rectifier 60 and a capacitor 61. If the alternating current peak voltage across the secondary winding 59 is considered to be $$\frac{V}{2}$$

the condenser 61 will be charged to $$\frac{V}{2}$$

on those half cycles when the lower end of secondary winding 59 is positive. The capacity of the condenser 61 is sufficiently great to maintain substantially the entire charge on the alternate half cycles, so that during the alternate half cycles when the upper end of the transformer winding 59 is positive, there is applied across a second diode rectifier 62 and a second condenser 63 a potential equal to V. The condenser 63 is of such capacity as to maintain substantially constant the voltage thereacross. With the arrangement shown at Fig. 7, the upper side of the condenser 63 is positive and the lower side is negative.

In the pulse generating circuit of Fig. 7, pulses are formed by charging of the capacitive transmission line 51 through the electron discharge device 50 whenever the device 50 is rendered conductive. At the end of each pulse, the charge on the pulse-forming transmission line 51 leaks off through an inductive reactor 64 connected between the common sides of the transmission line condensers and ground. The reactor 64 has a relatively high inductance compared to that of the line 51 and the load device 52, 53 so that during the short time required for charging the line 51, no appreciable energy is stored in the reactor 64.

According to the present invention, the inductive discharge reactor 64 of Fig. 7 is characterized by a negative reactance-current characteristic. It will be understood from the foregoing explanation of Fig. 1 that the effect of such a non-linear characteristic is initially to delay and thereafter to hasten the rate of discharge of the condensers in the artificial transmission line section 51. As previously mentioned, the surge impedance of the transmission line 51 is preferably slightly mismatched with the resistance of the load transformer 52, 53 so that at the termination of a pulse the anode of the discharge device 50 is driven slightly negative with respect to the cathode. By utilizing a non-linear leakage reactor 64 and thereby initially delaying the rate of discharge of the capacitive transmission line 51, the negative potential on the anode of the discharge device 50 is maintained longer than is possible with a linear leakage reactor. In this manner, the available deionization time for the discharge device 50 is increased at a predetermined repetition rate, or alternatively, a higher repetition rate is permissible for any predetermined deionization time.

While I have described only certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States, is:

1. A pulse generating circuit comprising a pulse-forming capacitive storage element, means including a source of electric current supply for charging said capacitive element, a non-oscillatory load circuit, means including an electron discharge device containing an ionizable discharge medium connected in series circuit relation in said load circuit for recurrently and substantially instantaneously initiating non-oscillatory changes in the charge of said capacitive element thereby to provide current pulses through said load circuit, and means including an inductive reactor having a negative reactance-current characteristic connected in series circuit relation with said capacitive storage element for restoring said capacitive element to its initial state of charge during the periods between pulses and at a rate controlled by said reactance.

2. A pulse generating circuit comprising a pulse forming capacitive storage element, a charging circuit for said element including a source of unidirectional electric current supply, a discharging circuit for said element, a load device connected in one of said circuits, said one circuit being non-oscillatory, switching means connected in series circuit relation with said load device, triggering means for said switching means arranged recurrently to initiate alternate charging and discharging of said storage element thereby to provide non-oscillatory current pulses through said load device, and a non-linear reactor connected in the other of said circuits to control the rate of change of charge of said capacitive storage element during intervals between pulses.

3. A pulse generating circuit comprising a pulse-forming capacitive storage element, a charging circuit for said element including a source of unidirectional electric current supply, a discharging circuit for said element, a load device connected in one of said circuits, said one circuit being non-oscillatory, an electron discharge device including an ionizable discharge medium connected in series circuit relation with said load device, means for recurrently rendering said discharge device conductive to initiate alternate charging and discharging of said storage element and to provide non-oscillatory current pulses through said load device, means for momentarily reversing the voltage across said discharge device at the termination of each pulse, and a non-linear reactor connected in the other of said circuits initially to minimize the rate of change of charge of said storage element at the termination of each pulse thereby to tend to maintain said reversed voltage and facilitate deionization of said discharge device.

4. A pulse generating circuit comprising a pulse forming capacitive transmission line section having a predetermined surge impedance, a charging circuit for said transmission line including a source of unidirectional electric current supply, a discharging circuit for said line, a load device having a resistance significantly smaller than said surge impedance and connected in one of said circuits, an electron discharge device including an ionizable discharge medium and a control electrode connected in series circuit relation with said load device, means including said control electrode for recurrently rendering said discharge device conductive cyclically to initiate substantially instantaneous changes in the charge of said transmission line thereby to provide current pulses through said load device, said transmission line reversing the voltage upon said electron discharge device at the termination of each of said pulses, and a non-linear reactor connected in the other of said circuits to delay the removal of said reverse voltage and control the rate of change of charge of said transmission line during intervals between pulses.

5. A pulse generating circuit comprising a pulse forming capacitive transmission line section, a charging circuit for said transmission line including a source of electric current supply, a discharging circuit for said line, a load device connected in one of said circuits, an electron discharge device including an ionizable discharge medium and a control electrode connected in series circuit relation with said load device, means including said control electrode for recurrently rendering said discharge device conductive cyclically and substantially instantaneously to initiate changes in the charge of said transmission line thereby to provide current pulses through said load device, means for reversing the voltage upon said electron discharge device at the termination of each of said pulses, and a negative reactance-current characteristic reactor connected in the other of said circuits to control the rate of change of charge of said transmission line during intervals between pulses and to delay the removal of said reverse voltage.

6. A pulse generating circuit comprising a pulse forming capacitive storage element, a charging circuit for said storage element including a source of electric current supply, a non-oscillatory discharge circuit for said storage element including a load device and a switching device connected in series circuit relation, triggering means for controlling said switching device recurrently and substantially instantaneously to initiate non-oscillatory pulse discharge of said storage element through said load device, and a non-linear reactor connected in said charging circuit to control the rate of change of charge of said capacitive storage element during intervals between said pulse discharges.

7. A pulse generating circuit comprising a pulse-forming capacitive storage element, a non-oscillatory charging circuit for said storage element including a source of electric current supply and a load device, means including switching means in said charging circuit recurrently and substantially instantaneously to initiate non-oscillatory pulse charging of said storage element through said load device, and a discharge circuit for said storage element including a non-linear reactor connected in series circuit relation with said storage element to control the rate of change of charge of said storage element during intervals between said charging pulses.

8. A pulse generating circuit comprising a pulse-forming capacitive storage element, a charging circuit for said storage element including a source of unidirectional electric current supply, a non-oscillatory discharge circuit for said storage element including a load device and an electron discharge device having an ionizable discharge medium connected in series circuit relation, means including said electron discharge device recurrently and substantially instantaneously to initiate pulse discharge of said storage element through said load device, and an inductive reactor having a negative reactance-current characteristic connected in said charging circuit to control the charging of said capacitive storage element during intervals between said pulse discharges.

9. A pulse generating circuit comprising a pulse-forming capacitive storage element, a non-oscillatory charging circuit for said storage element including a source of unidirectional electric current supply and a load device, an electron discharge device including an ionizable discharge medium connected in series circuit relation in said charging circuit, means including said electron discharge device for recurrently and substantially instantaneously initiating non-oscillatory pulse charging of said capacitive storage element from said source through said load device, and a discharge circuit for said capacitive storage element including an inductive reactor having a negative reactance-current characteristic.

10. A pulse generating circuit comprising a pulse-forming capacitive transmission line section, a charging circuit for said transmission line including a source of unidirectional electric current supply, a discharging circuit for said transmission line including a load device and a switching device connected in series circuit relation, triggering means controlling said switching means recurrently and substantially instantaneously to initiate pulse discharge of said storage element through said load device, and a non-linear reactor connected in said charging circuit to control the rate of change of charge of said capacitive storage element between said pulse discharges.

11. A pulse generating circuit comprising a pulse-forming capacitive transmission line section, a charging circuit for said transmission line including a source of unidirectional electric current supply and a load device, means including a switching device in said charging circuit for recurrently and substantially instantaneously initiating pulse charges of said transmission line through said load device, and a discharge circuit for said transmission line including an inductive reactance having a negative reactance-current characteristic connected in series circuit relation with said transmission line section to control the discharge of said transmission line during intervals between said charging pulses.

12. A pulse generating circuit comprising a pulse-forming capacitive transmission line section having a predetermined surge impedance, a charging circuit for said transmission line including a source of unidirectional electric current supply, a discharge circuit for said transmission line including a load element and an electron discharge device connected in series circuit relation, said electron discharge device including an ionizable discharge medium and said load element having an impedance significantly smaller than said surge impedance, means including said discharge device for recurrently and substantially instantaneously initiating pulse discharge of said transmission line through said load element, said transmission line section terminating said pulses by reflection and reversing the voltage applied to said electron discharge device, and a saturable core reactor connected in said charging circuit to delay the removal of said reversed voltage and to control the recharging of said transmission line section during intervals between pulses.

13. A pulse generating circuit comprising a pulse-forming capacitive transmission line section having a predetermined surge impedance, a charging circuit for said transmission line including a source of unidirectional electric current supply and a load device having an impedance significantly smaller than said surge impedance, an electron discharge device connected in series circuit relation in said charging circuit and including an ionizable discharge medium, means including said electron discharge device for recurrently and substantially instantaneously initiating pulse charging of said transmission line section through said load device, said charging pulses being terminated by reflection of voltage through said transmission line and said reflected voltage reversing the voltage applied to said electron discharge device, and a discharge circuit for said transmission line including a saturable core reactor arranged to delay the removal of said reversed voltage and to control the rate of discharge of said transmission line.

14. A pulse generating circuit comprising a pulse-forming capacitive storage element, a charging circuit for said storage element including a source of electric current supply, a discharge circuit for said storage element, a load device connected in one of said circuits, said one circuit being non-oscillatory, a non-linear inductive reactance connected in the other of said circuits, said capacitive storage element and said reactance being tuned to a predetermined natural frequency of oscillation, and means including a switching device in series circuit relation with said load device for periodically initiating cyclic charging and discharging of said storage element at a repetition rate determined in accordance with said natural frequency thereby to provide periodic current pulses through said load device at said repetition rate.

15. A pulse generating circuit comprising a pulse-forming capacitive storage element, a charging circuit for said storage element including a source of unidirectional electric current supply and a non-linear inductive reactor, said reactor and said capacitive storage element being tuned to a predetermined natural frequency of oscillation, a non-oscillatory discharge circuit for said storage element including a load device and an electron discharge device connected in series circuit relation, said electron discharge device including an ionizable discharge medium, and means including said electron discharge device for periodically and substantially instantaneously initiating non-oscillatory pulse discharge of said storage element through said load device at a repetition rate determined in accordance with said natural frequency, said non-linear reactor initially delaying the recharging of said capacitive storage element thereby to facilitate deionization of said electron discharge device.

16. A pulse generating circuit comprising a pulse-forming capacitive storage element, a non-oscillatory charging circuit for said storage element including a source of unidirectional electric current supply and a load device, an electron discharge device including an ionizable discharge medium connected in series circuit relation in said charging circuit, a discharge circuit for said capacitive storage element including an inductive reactor having a negative reactance-current characteristic, said discharge circuit being tuned to a predetermined natural frequency of oscillation, and means including said electron discharge device for periodically and substantially instantaneously initiating non-oscillatory pulse charging of said capacitive storage element through said load device at a repetition rate determined in accordance with said natural frequency, said inductive reactor initially delaying the discharge of said capacitive storage element at the termination of each of said pulses thereby to facilitate deionization of said electron discharge device.

17. A pulse generating circuit comprising a pulse-forming capacitive storage element, a charging circuit for said storage element including a source of electric current supply and a unidirectional conducting device, a non-oscillatory discharging circuit for said storage element including a load device and a switching device connected in series circuit relation, triggering means for said switching device arranged substantially instantaneously to initiate non-oscillatory pulse discharges of said storage element through said load device, and a non-linear reactor connected in said charging circuit to control the rate of change of charge of said capacitive storage element between said pulse discharges.

18. A pulse generating circuit comprising a pulse-forming capacitive storage element, a charging circuit for said storage element including a source of unidirectional electric current supply and a blocking rectifier, a non-oscillatory discharge circuit for said storage element including a load device and an electron discharge device having an ionizable discharge medium connected in series circuit relation, means including said electron discharge device for substantially instantaneously initiating non-oscillatory pulse discharges of said storage element through said load device, and an inductive reactor having a negative reactance-current characteristic connected in said charging circuit to control the charging of said capacitive storage element during intervals between said pulse discharges.

19. A pulse generating circuit comprising a pulse-forming capacitive transmission line section having a predetermined surge impedance, a charging circuit for said transmission line including a source of unidirectional current supply and a blocking rectifier, a discharge circuit for said transmission line including a load element and an electron discharge device connected in series circuit relation, said electron discharge device including an ionizable discharge medium and said load element having an impedance substantially equal to said surge impedance, means including said discharge device for substantially instantaneously initiating pulse discharge of said transmission line through said load element, said transmission line section terminating said pulses by reflection, and a saturable core reactor connected in said charging circuit to control the recharging of said transmission line section during intervals between pulses.

HAROLD W. LORD.

REFERENCES CITED

The following references are of record in the file of this patent:

UNITED STATES PATENTS

| Number | Name | Date |
| --- | --- | --- |
| 1,830,238 | Nukiyama et al. | Nov. 3, 1931 |
| 2,073,247 | Miller | Mar. 9, 1937 |
| 2,098,052 | Lord | Nov. 2, 1937 |
| 2,102,371 | Miller | Dec. 14, 1937 |
| 2,222,620 | Klemperer | Nov. 26, 1940 |
| 2,251,877 | Hagedorn | Aug. 5, 1941 |
| 2,272,998 | Bjornson | Feb. 10, 1942 |

FOREIGN PATENTS

| Number | Country | Date |
| --- | --- | --- |
| 505,143 | Great Britain | May 5, 1939 |